United States Patent Office 3,065,967
Patented Nov. 27, 1962

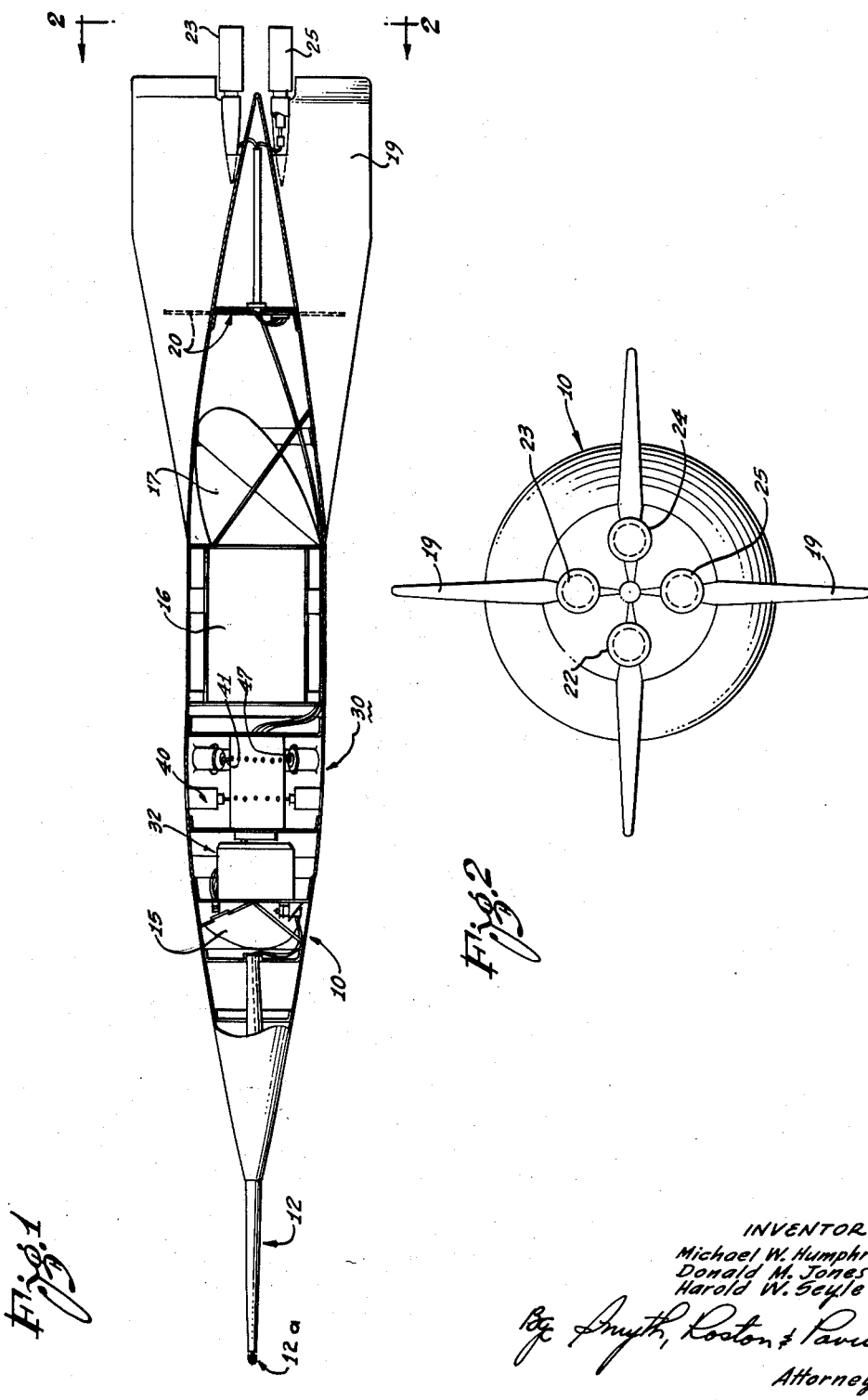

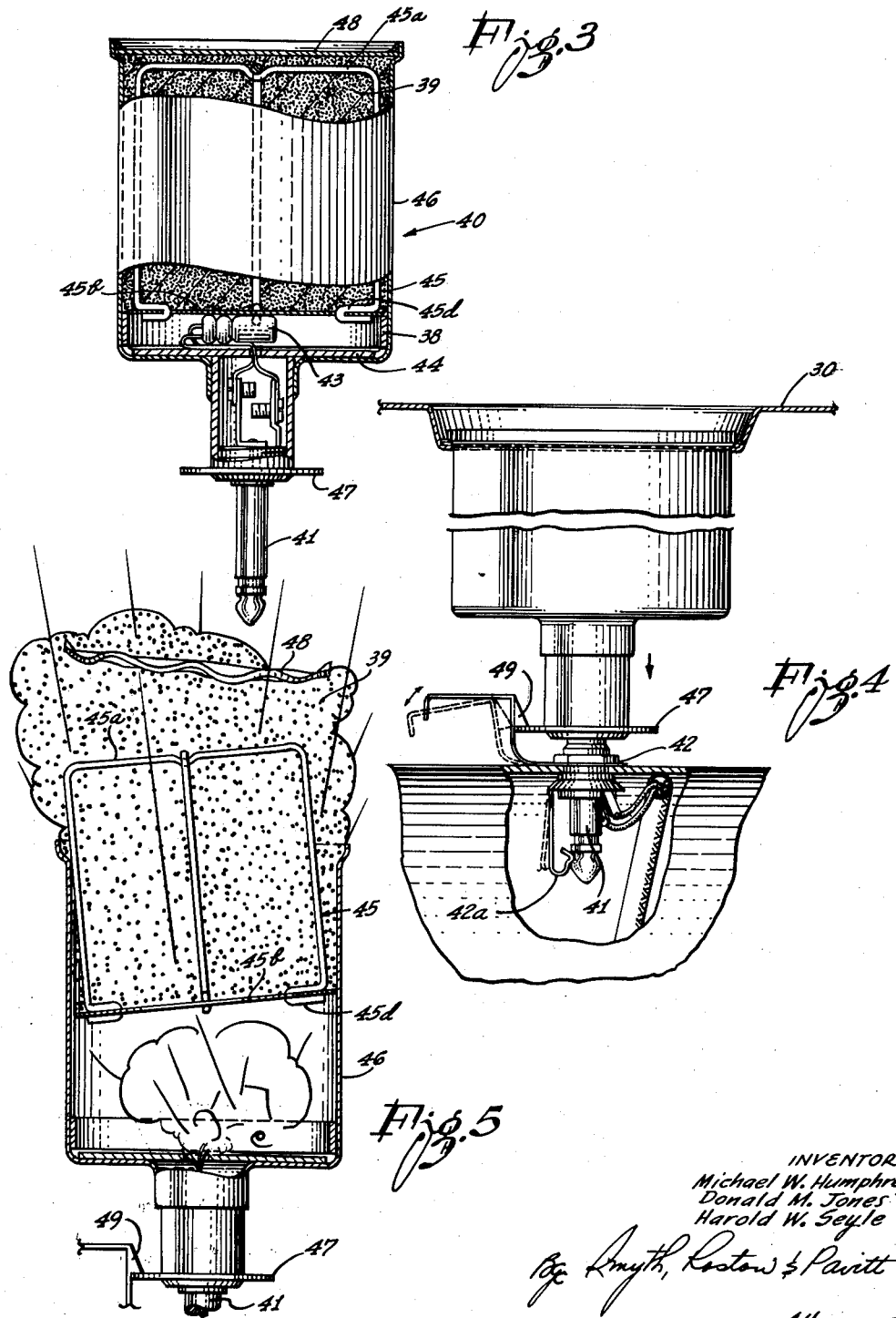

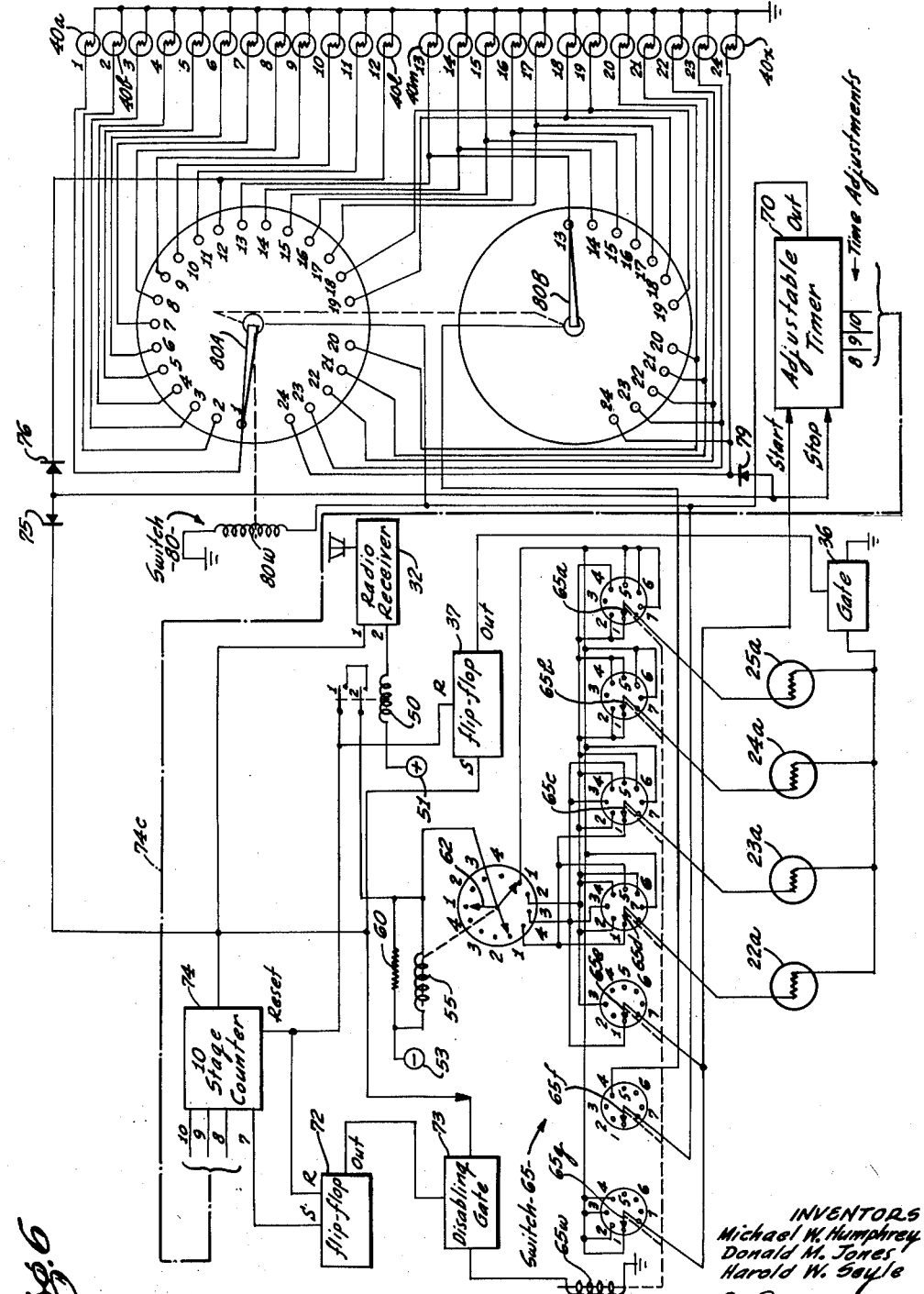

3,065,967
TOW TARGET
Michael W. Humphrey, Hawthorne, Donald M. Jones, Manhattan Beach, and Harold W. Seyle, Santa Monica, Calif., assignors to Del Mar Engineering Laboratories, Los Angeles, Calif., a corporation of California
Filed June 20, 1960, Ser. No. 37,153
3 Claims. (Cl. 273—105.3)

This invention relates to apparatus for use on airborne vehicles for producing visible signals to facilitate the detection and tracking of the vehicles. More particularly, this invention pertains to remotely controlled apparatus for producing smoke signals and for igniting flares at an unmanned aircraft such as a drone or a towed target.

Apparatus for producing smoke signals at a towed aircraft is disclosed in the pending patent application Serial No. 550,995, filed on December 5, 1955, by Bruce E. Del Mar, now Patent No. 2,945,222. The apparatus includes smoke signal devices, each having a collapsible container and a discharge nozzle through which the smoke signals are provided. The devices may be operated in succession under control of signals from a remote location. Apparatus for successively igniting flares at a towed target is disclosed in the Patent 2,869,120, granted to O. B. Lolmaugh, W. E. Thornton, and Charles A. Smith on January 13, 1959.

In apparatus of this type, exemplified by the Del Mar pending application and the Lolmaugh et al. patent, the programming of the particular visible signals is rigid. The flares, for example, are ignited in order responsive to successive control signals from a remote location. There are many applications, however, where different programs of visible signals are desired without utilizing a different towed target for each program.

In a specific illustrative embodiment of this invention, a remotely controlled airborne vehicle is provided having apparatus for providing any one of a number of different programs of visible signals in the form of combinations of smoke puffs and flares. The program may be selected either manually before flight or by remote control during flight. The same airborne vehicle may, accordingly, be utilized to provide completely different programs of visible signals at different times. In one program, illustratively, a large number of spaced smoke puffs may be provided and in another a salvo of flares may be ignited.

Features of the invention pertain to the provision of means for halting any program of visible signals while the airborne vehicle is in flight and for selecting another program for the remaining smoke and flare apparatus on the vehicle. Further features of this invention relate to the provision of means for remotely adjusting the repetition rate for providing the successive smoke puffs during flight. Control signals at the airborne vehicle are received over two channels; the first to adjust or change the program, and the second to successively initiate different stages of the program. The signals over the first channel operate switching means for selecting any one of a large number of programs. When signals are received over the first channel in the middle of any visible signal program, the program is automatically halted. The new program is selected and initiated at any stage of the program. To change the stage of the program without igniting any flares, switching means responsive to signals simultaneously received over both channels are provided for changes in stages and inhibiting the ignition of the flares.

In the specific illustrative embodiment, the airborne vehicle is a supersonic target and the smoke signal apparatus includes a number of cartridges which are operated by igniting small explosives or squibs. When a squib is set off, it ejects a piston from the vehicle which carries with it the powder forming the smoke puff. Features of the invention relate to the provision of an expendable piston having a wire frame for maintaining the alignment of the piston during ejection from the supersonic vehicle. The piston walls and base of the cartridge are mounted on an electrical plug for ready disassembly for refilling. The cartridges are mounted in a central removable section of the target. If smoke signals are not required in the programs, the section may be removed and the target then has provision only for flares. The removable section includes a number of electrical jacks which mate with the electrical plugs of the cartridges.

Further advantages and features of this invention will become apparent upon consideration of the following description when read in conjunction with the drawing wherein:

FIGURE 1 is a partial sectional view of the supersonic target illustrating the powder cartridges and the flares utilized in the visible signalling system of this invention;

FIGURE 2 is a rear view of the supersonic target illustrating the flares utilized in the visible signalling system of this invention;

FIGURE 3 is a sectional view of the smoke cartridge utilized in the visible signalling system of this invention;

FIGURE 4 is a side view of the jack and a smoke cartridge of the visible signalling system of this invention illustrating how the cartridge is supported in the jack;

FIGURE 5 is a partial sectional view of the cartridge utilized in the visible signalling system of this inventon illustrating the movement of its expendable piston; and FIGURE 6 is a partial circuit and partial functional representation of the visible signalling system of this invention.

Referring first to FIGURES 1 and 2, a streamlined tow target 10 is depicted having suitably reinforced thin walls of molded paper. The tow target 10 has a set of tail vanes 19 for stabilizing the flight of the target 10. The tow target 10 has an integral rigid probe 12 which is of slender and tapered configuration. The nose probe 12 has a swivel joint 12a for attaching the tow cable, not shown, to the target 10. An aircraft, also not shown, tows the target 10 by means of the tow cable attached to the swivel joint 12a of the nose probe 12. Tow targets of this general type having a nose probe and being suitable for supersonic flight are disclosed in the above-identified Del Mar Patent 2,869,120 and also in a copending patent application Serial No. 617,569, filed by Robert J. Hopper and Boyd B. Elder on October 22, 1956, now Patent No. 2,953,442.

The tow target 10 includes a number of radar reflectors 15, 16 and 17 which facilitate the detection of the tow target 10 by remotely located radar equipment. The tow target 10 also includes means which can be remotely controlled for providing visible signals to facilitate the visual detection of the target 10. The means for providing the visual signals includes a number of flares 22 through 25 which extend rearwardly from the tow target 10 and a marker assembly 30 in the central portion of the tow target 10. As is hereinafter described, the marker assembly 30 includes a relatively large number of powder cartridges 40 for providing smoke signals or puffs. Both the smoke signals and the flare signals are controlled in a multistage adjustable program which can be pre-selected or which can be adjusted from a remote location during flight. The marker assembly 30 may be assembled separately and then the forward and aft portions of the tow target 10 attached thereto. If the provision of smoke signals is not required, the marker assembly 30 is not incorporated in the tow target 10. The resulting tow target is then somewhat shorter or a spacer panel may be utilized instead of the marker assembly 30 to provide a target of similar length.

As indicated above, the marker assembly 30 includes a number of powder cartridges 40. Illustratively, the marker assembly 30 may include twenty-four smoke cartridges 40. Each of the cartridges 40, which are depicted particularly in FIGURES 3 through 5, provides for one smoke puff when it is operated. The smoke puff is formed from a fluorescent powder 39 in each of the cartridges 40 which may be an inert paint pigment. Illustratively, a fluorescent fire orange pigment designated A–14 powder and manufactured by the Switzer Bros. Inc., of Cleveland, Ohio, may be utilized. As shown in FIGURES 3 through 5, the cartridges 40 may include a plug 41 for mounting the cartridge in a jack 42. The cartridges 40 are, accordingly, readily replaceable in the marker assembly 30.

As shown specifically in FIGURE 3, electrical connections are provided from the plug 41 to a squib 43 in the cartridge 40. The squib 43, which consists of an explosive material that can be ignited by an electrical current, is positioned between a backing plate 44 and a movable ejector or piston 45. The squib 43 may, illustratively, have a 1.5 grain charge and be of the type designated S–75 manufactured by the E. I. du Pont de Nemours & Co., Inc., of Wilmington, Delaware.

The piston 45 includes a wire frame ejector member 45a which is enclosed by a cylindrical casing 46 of the cartridge 40. The member 45a is a crossed wire arrangement supported on a disc 45b. The disc 45b, which may be made of aluminum, is supported on a ring 38 affixed to the side of the casing 46. The ring 38 forms a shoulder for supporting the piston 45 in the casing 46. The space between the disc 45b and a lid 48 is filled with the smoke powder 39. The lid 48, which may be made of aluminum, is glued to the end of the casing 46. When ejected into the airstream, the powder 39 forms a smoke puff which is readily visible at a considerable distance.

The wire frame 45a of the piston 45 functions as a guide to maintain the base or disc 45b of the piston 45 in substantial transverse alignment to the axis of the cylindrical casing 46 during the ejection movement of the piston 45. The frame member 45a consists of two crossed wires of rectangular configuration, the ends 45d of which are inserted in holes in the disc 45b. The crossed wires may be welded together at their crossing. As illustrated in FIGURES 3 and 5, the ends 45d are bent about the opposite sides of the disc 45b to form a relatively rigid structure.

When the squib 43 is exploded by electrical current introduced through the plug 41, the pressure formed in the space between the backing plate 44 and the base or disc 45b of the piston 45 forces the frame member 45a of the piston 45 against the lid 48. The glued connection holding the lid 48 to the casing 46 breaks under the pressure so that the lid 48 is ejected from the assembly 30 followed by the piston 45 filled with the smoke powder. In this manner, the lid 48 and the piston 45 are ejected from the towed aircraft 10 when the squib 43 of the cartridge 40 is exploded. FIGURE 5 illustrates how the wire frame member 45b of the piston 45 keeps the piston 45 in substantial alignment until the end of its travel in the casing 46 of the cartridge 40. Means for maintaining the alignment is required because the piston 45 is ejected from the side of a supersonic target 10 and because the squib may develop uneven pressures against the disc 45b. The relatively high fluid pressure along the sides of the target 10 during flight tends to force the piston to rotate as it moves out of the casing 46.

The frame member 45a also provides for the quick dispersion of the powder in the air stream. A cylindrically shaped, solid surface, piston would not provide for a rapid or adequate dispersion of the powder. As the piston is ejected, there is little inhibition to the rapid powder dispersion and smoke puff formation.

As indicated above, and as shown in FIGURE 4, the plug 41 supports the cartridge 40 in the jack 42. A washer or ring 47 is provided on the cartridge 40 which engages a clip 49 attached to the jack 42. A finger 42a of jack 42 engages the tip of the plug 41 when the plug 41 is inserted in the jack 42. The clip 49 bears against the ring 47 to hold the plug 41 in the jack 42. To remove the cartridge 40, the clip 49 is moved away from the ring 47, as indicated by the dashed lines, so that the plug 41 can be removed from the jack 42.

The cartridges 40 in the marker assembly 30 are utilized to provide first visual signals, and the flares 22 through 25, shown in FIGURES 1 and 2, are utilized to provide second visual signals. The signals are provided as part of any one of a number of programs of visual signals which can be preselected before flight or which can be selected during flight utilizing a communication system including a receiver 32 in FIGURE 6.

Referring to FIGURE 6, the radio receiver 32 at the towed aircraft 10 functions to receive command signals from a remote location. The remote location may be either at the towing aircraft, not shown, or at a ground position. The command signals may also be transmitted from another aircraft as for example an aircraft which attacking the towed target 10. The command signals are provided through two communication channels to the radio receiver 32. One of the two channels is utilized to initiate the different steps or stages of a program of visual signals, and the other of the channels is utilized for adjusting or changing the program.

The receiver 32 has two output terminals 1 and 2 to which the signals in the two channels are respectively provided. The signals may be pulses of relatively long duration modulated on two different subcarriers. Illustratively, the pulse duration may be 5 seconds. The receiver 32 includes means, not shown, for recovering and separating the subcarriers and then for demodulating the subcarriers to recover the pulsed command signals.

As indicated above, the visual indication in the form of smoke puffs and flares may be provided as parts of different programs of indications. A seven-position selector switch 65 in the target 10 may be preset to determine the particular program of visual signals to be provided by the towed aircraft 10. The switch 65 may be manually set before flight or it may be stepped by a stepping relay 65w during flight. In the specific illustrative embodiment of this invention, the tow target 10 carries four flares 22–25 and twenty-four cartridges 40. In FIGURE 6, the twenty-four squibs 40a–40x of the cartridges 40 are aligned along the right of the figure and the four squibs 22a–25a of the flares 22–25 are aligned along the bottom of the figure. The present invention is not restricted to any particular number of flares and smoke cartridges as their specific numbers are merely illustrative.

The seven different programs each include one to four different stages, and each stage of a program requires a separate start pulse over the second channel of the receiver 32 to its output terminal 2. The following table lists the smoke and flare signals provided during the stages of the seven programs which may be selected by setting the seven-position selector switch 65:

| Position | Program Stages | | | |
|---|---|---|---|---|
| | 1 | 2 | 3 | 4 |
| 1 | 12 puffs | 2 flares | 12 puffs | 2 flares. |
| 2 | 12 puffs | 4 flares | | |
| 3 | 12 puffs | 12 puffs | 4 flares | |
| 4 | 24 puffs | 4 flares | | |
| 5 | flare | flare | flare | flare. |
| 6 | 2 flares | 2 flares | | |
| 7 | 4 flares | | | |

Assume first that the selector switch 65 is set at its position 1 and that it is not desired to adjust the program during flight. Each pulse through the second channel initiates one of the four stages of the program. The first pulse received at the radio receiver 32 and provided at its output terminal 2 operates a relay 50. One terminal of the winding of relay 50 is connected to the output terminal 2 of the radio receiver 32, and its other terminal is connected to a source 51 of a positive potential. When the relay 50 operates, it completes a path for energizing a winding 55 of a stepping relay 62. The winding 55, shunted by a resistor 60, is coupled on one side by the operated armature 2 of the relay 50 to a common ground connection, and on the other side to a potential source 53.

When the winding 55 is energized, the relay 62 is enabled and at the termination of the energization of the winding 55, the relay 62 steps to its next position. The stepping relay 62 has three contact arms and three sets of four contacts 1–4 associated respectively with the three contact arms. The arms are at contacts 4 before the first pulse is received at the receiver 32.

At the end of the first pulse, the relay 62 advances from its position 4 to its position 1. When the stepping relay 62 advances from its position 4 to its position 1, it provides a connection from the source 53 through the resistor 60, the switch 62 and a pole or bank 65g of the switch 65 to an adjustable timer 70. The switch 65 has seven ganged poles 65a–65g, each of which has seven contacts 1–7. As indicated above in the program table for position 1, twelve smoke puffs are successively provided. During the first stage, the smoke puffs are provided under control of the adjustable timer 70. The period of the adjustable timer may, illustratively, be 4.25 seconds so that it provides a series of pulses at 4.25 second intervals from the time it is started by the stepping relay 62 until it is stopped. The operating path to the start lead of the timer 70 is from the grounded resistor 60 through a contact 1 of relay 62, and the contact 1 of pole 65g of switch 65. The duration of each pulse from the timer 70 may, illustratively, be 200 milliseconds.

The pulses from the adjustable timer 70 are provided to a winding 80w of a twenty-four position stepping relay 80. The winding 80w is associated with two poles or banks 80a and 80b, each consisting of twenty-four contacts. The successive pulses from the adjustable timer 70 step the switch 80 from one position to the next and the stepping sequence continues until the timer 70 is halted. The pulses from the timer 70 are also provided through the successive contacts of the bank 80a to the squibs 40a–40x, described above, which are associated therewith. In this manner, the pulses through the bank 80a function to successively fire the twelve squibs 40a through 40L inclusive.

When the switch 80 reaches position 12, the negative pulse provided from the adjustable timer 70 is coupled through the pole 88 and a diode 76 to the stop terminal of the adjustable timer 70. The adjustable timer 70 is, accordingly, automatically halted when the switch 80 reaches its twelfth position. The system remains in this condition with the adjustable timer 70 halted, the switch 80 at position 12 and the stepping switch 62 at position 1, until the next pulse is received over the second channel at the radio receiver 32. The first stage of the program of visual signals has, in this manner, been completed. The next received start pulse initiates the second stage of the program.

When the second pulse is received, it pulses the relay 50 to in turn step the switch 62 to position 2. As indicated above in the table of the selector programs, two flares are simultaneously ignited during the second stage. With the switch 62 at position 2, the battery 53 is coupled through the resistor 60, switch 62 at position 2, through the pole 65b to the squib 24a and also through the pole 65a to the squib 25a. The squibs 22a–25a, as indicated above, are respectively part of the flares 22 through 25 at the rear of the tow target 10. One terminal of each of the squibs 22a–24a is multipled through a normally enabled gate 36 to ground. As is hereinafter desrcibed, when the gate 36 is disabled, the path to ground is opened. The two squibs 24a and 25a of the flares 24 and 25 are ignited when the potential source 53 is connected thereto by the switch 62. During the second stage of the program, two flares are, accordingly, simultaneously ignited.

The third stage is initiated when a third pulse is received over the second channel at the receiver 32. The third pulse steps the switch 62 to its third position to again initiate the operation of the adjustable timer 70. The connection is provided from the source 53 through resistor 60, the switch 62 at position 3, and pole 65e of the switch 65 to the start terminal of the adjustable timer 70. As described above, the switch 80 was halted at its terminal 12 at the end of the first stage of the program. The adjustable timer 70 steps the switch 80 through its positions 13 through 24 to successively fire the squibs 40m–40x corresponding to these positions. A second series of smoke puffs is, accordingly, provided spaced at intervals of 4.25 seconds. When the switch 80 reaches position 24, the pulse from the adjustable timer 70 is provided through the pole 80a at position 24 and a diode 79 to the stop terminal of the adjustable timer 70. The timer 70 is, accordingly, halted to terminate the third stage of the program.

When the fourth pulse is received over the second channel at the receiver 32, the switch 62 is stepped in its fourth position to fire the last two flares. The operating potential is coupled through the switch 62 and poles 65d and 65c to the squibs 22a and 23a respectively. In this manner, the four stages of the program selected by the switch 65 are succesively initiated by the four pulses received over the second channel. As described above, the switch 65 may be set in any one of seven different positions to select seven different programs. As another illustration of the programs which can be selected by the switch 65, assume that the switch 65 is set at its position 7. With the switch 65 at position 7, the first pulse over the second channel fires a salvo of all four flares 22 through 25. Operating potential is provided through the switch 62 at position 1 through all four poles 65a–65d of the switch 65 at position 7 to the squibs 22a–25a. Succeeding pulses do not have any affect because only a single stage is utilized for the program selected by the switch 65 at its position 7. Any one of the seven programs may, accordingly, be manually selected before flight, and each stage of the selected program can be initiated by remote control during flight.

During flight, a program may be halted even if it has been initiated. Moreover, the program may be changed, the selected stage may be changed and the timing of the adjustable timer 70 may also be changed. The programming is, accordingly, quite flexible. The signals for these controls are provided through the first channel of the radio receiver 32. In order to change the program, the switch 65 is stepped by energizing its winding 65w. The pulses received through the first channel of the radio receiver 32 are provided through a normally enabled gate 73 to the winding 65w. If the switch 65 was preset to its position 1 and it is desired, illustratively, to select the sixth program, five pulses are transmitted and coupled to the winding 65w to step the switch 65 from its first to its sixth position. Thereafter, the second channel of the radio receiver 32 is utilized to initiate the stages of the selected sixth program.

The first pulse received through the first channel also functions to set a flip-flop circuit 37. The circuit 37 disables the gate 36 to open the operating circuit for the squibs 22a–25a to prevent their ignition during the program changing sequence.

The pulses through the first channel are also provided through a diode 75 to the stop terminal of the adjustable timer 70. If a sequence of smoke puffs is, accordingly, in progress under the control of the adjustable timer 70, a pulse received through the first channel will halt the adjustable timer 70. If it is desired to halt the timer 70 and yet maintain the same program, seven pulses are provided through the first channel so that the switch 65 is returned to its initial position.

The seventh pulse through the first channel functions also to set a flip-flop circuit 72, the function of which is hereinafter described. The flip-flop circuit 72 is operated by a 10 stage counter 74 coupled to the output terminal 1 of the radio receiver 32. The counter 74 keeps track of the pulses received through the first channel of the radio receiver 32. The timing of the adjustable timer 70 may be changed utilizing a number of pulses greater than 7 through the first channel. In the specific illustrative embodiment, three different adjustments of the timer 70 are provided. These adjustments are provided respectively when 8, 9 or 10 pulses are received through the first channel of the receiver 32. The seventh pulse through the first channel steps the counter 74 to its seventh position to operate the flip-flop circuit 72. When the flip-flop circuit 72 operates, it disables the gate 73 so that subsequent pulses through the first channel are not provided to the winding 65w of the switch 65. The eight pulse is provided from the counter 74 through a cable 74c to the adjustable timer 70. Similarly, the ninth and tenth pulses are provided thereto. These pulses at the timer 70 function to adjust the timing between successive pulses to change the spacing of the smoke puffs in the slip stream.

After an adjustment, either of the program or timing, the first pulse through the second channel of the radio receiver 32 functions to reset the counter 74 and to reset the flip-flop circuit 37 and the flip-flop circuit 72 if it has been set. When relay 50 operates responsive to the first pulse over the second channel the ground connection is coupled through its armature 1 to the reset terminals of the counter 74 and the flip-flop circuits 72 and 37. These components are, accordingly, returned to normal. If it is desired to both adjust the timing and to change the program, the timing is first adjusted. Then, a pulse is provided simultaneously through the two channels to reset the counter 74 and the flip-flop circuit 72 but yet to prevent the initiation of the program. The pulse through the second channel resets the counter 74 and the flip-flop circuits 72 and 37, and the pulse through the first channel 2 insures that the time 70 remains stopped and that the gate 36 is disabled. Thereafter, the program can be changed in the manner described above. If it is desired to change the setting of the switch 63 for the stage selection, additional pulses may be provided through the first channel but it is accompanied by a pulse through channel 2 to prevent supplying visual signals during the adjustment. In this manner, the programming of the visual signals is quite flexible and may readily be adjusted during flight as well as on the ground. The program, program stage and timing between puffs may all be changed by remote control.

Although this invention has been disclosed and illustrated with reference to particular applications, the principles involved are suspectible of numerous other applications which will be apparent to persons skilled in the art. The invention is, therefore, to be limited only as indicated by the scope of the appended claims.

We claim:

1. In an aerial target adapted to be towed through the atmosphere at a very high rate of speed, a plurality of signal devices mounted on said target to eject a visible material from said target for providing visual signals to facilitate the visual detection of said target, electrically responsive control means in each of said signal devices for individually actuating the signal device associated therewith in response to an electrical signal, receiving means for receiving successive control signals from a remote location, switching means adapted to be operatively interconnected with at least a portion of said control means for feeding said electrical signals thereto to thereby selectively energize each of said control means according to a predetermined program, a selector adapted to be operatively interconnected with at least a portion of said switching means for feeding said electrical signals to preselected ones of said switches to thereby cause only preselected phases of said program to be initiated, and means operatively interconnected with said receiving means and said switching means and being responsive to said control signals for changing the setting of said switches to alter said program.

2. In an aerial target adapted to be towed through the atmosphere at a very high rate of speed, a plurality of smoke cartridges mounted on said target at different positions thereon, each of said cartridges including an ejectable member having a lid substantially flush with the exterior surface of said target and containing a smoke-producing powder for providing visual signals to facilitate the visual detection of said target, an explosive in each of said cartridges responsive to an electrical signal to thereby be detonated to individually eject said members and lids to release the powder therein, switching means operatively interconnected with said explosives for feeding said electrical signals thereto for selectively detonating each of said explosives according to a predetermined program, a selector adapted to be operatively interconnected with said switching means for selectively energizing said switches to initiate different phases of said program, receiving means for receiving successive control signals from a remote location, and means operatively interconnected with said receiving means and said switches and responsive to said control signals for changing the setting of said switches to alter said program.

3. In an aerial target adapted to be towed through the atmosphere at a very high rate of speed, a plurality of smoke cartridges mounted on said target at different positions thereon, each of said cartridges including an ejectable member having a lid disposed substantially flush with the exterior surface of said target and containing a smoke-producing powder for providing visual signals to facilitate the visual detection of said target, an explosive in each of said cartridges responsive to an electrical signal to thereby detonate to individually eject said members and lids from said target to thereby release said powder, switching means operatively interconnected with said explosives, said switching means including a timer for selectively feeding said electrical signals to said explosives for detonating said explosives in sequences according to a predetermined program, a selector adapted to be operatively interconnected with said switching means for selectively energizing said switches to initiate the different sequences in said program, receiving means for receiving successive control signals from a remote location, and means responsive to said control signals for changing the setting of said switches to alter said program.

References Cited in the file of this patent

UNITED STATES PATENTS

| | | |
|---|---|---|
| 2,334,552 | Hammond | Nov. 16, 1943 |
| 2,831,967 | Bayze | Apr. 22, 1958 |
| 2,923,930 | Del Mar | Feb. 2, 1960 |
| 2,927,793 | Del Mar | Mar. 8, 1960 |
| 2,945,222 | Del Mar | July 12, 1960 |
| 2,959,416 | Baldwin et al. | Nov. 8, 1960 |

OTHER REFERENCES

Electronics for December 1949, pp. 72–74.